United States Patent
Frantz et al.

(10) Patent No.: US 11,725,592 B2
(45) Date of Patent: Aug. 15, 2023

(54) AERONAUTICAL PROPULSION SYSTEM HAVING A LOW LEAKAGE FLOW RATE AND IMPROVED PROPULSION EFFICIENCY

(71) Applicants: SAFRAN AIRCRAFT ENGINES, Paris (FR); SAFRAN TRANSMISSION SYSTEMS, Colombes (FR)

(72) Inventors: Caroline Marie Frantz, Moissy-Cramayel (FR); Gilles Alain Marie Charier, Moissy-Cramayel (FR); Adrien Louis Simon, Moissy-Cramayel (FR)

(73) Assignees: SAFRAN AIRCRAFT ENGINES, Paris (FR); SAFRAN TRANSMISSION SYSTEMS, Colombes (FR)

( * ) Notice: Subject to any disclaimer, the term of this patent is extended or adjusted under 35 U.S.C. 154(b) by 0 days.

(21) Appl. No.: 17/783,950

(22) PCT Filed: Dec. 11, 2020

(86) PCT No.: PCT/FR2020/052390
§ 371 (c)(1),
(2) Date: Jun. 9, 2022

(87) PCT Pub. No.: WO2021/116620
PCT Pub. Date: Jun. 17, 2021

(65) Prior Publication Data
US 2023/0007929 A1    Jan. 12, 2023

(30) Foreign Application Priority Data
Dec. 11, 2019 (FR) ...................................... 1914191

(51) Int. Cl.
F02C 7/36    (2006.01)

(52) U.S. Cl.
CPC .......... *F02C 7/36* (2013.01); *F05D 2220/323* (2013.01); *F05D 2220/324* (2013.01);
(Continued)

(58) Field of Classification Search
CPC ................. F02C 7/36; F05D 2220/323; F05D 2220/324; F05D 2220/325; F05D 2240/54;
(Continued)

(56) References Cited

U.S. PATENT DOCUMENTS

2016/0090988 A1    3/2016 Venter
2016/0356225 A1    12/2016 Sheridan
(Continued)

OTHER PUBLICATIONS

French Search Report with Written Opinion dated Aug. 11, 2020 in French Application No. 1914191.
(Continued)

*Primary Examiner* — Yi-Kai Wang
(74) *Attorney, Agent, or Firm* — Sughrue Mion, PLLC

(57) ABSTRACT

A propulsion system includes a drive shaft movable about an axis of rotation, a fan, a fan shaft that drives the fan, and a reduction device coupling the drive shaft and the fan shaft. The reduction device has first and second reduction stages and includes a sun gear, centered on the axis and driven by the drive shaft, a ring gear that is coaxial with the sun gear and that drives the fan shaft about the axis, and planet gears distributed circumferentially about the axis between the sun gear and the ring gear. Each planet gear includes a first portion meshed with the sun gear and a second portion meshed with the ring gear. A diameter of the first portion is different from a diameter of the second portion, and the first portion of the planet gears extend between the second portion of the planet gears and the fan.

15 Claims, 4 Drawing Sheets

(52) U.S. Cl.
CPC .... *F05D 2220/325* (2013.01); *F05D 2240/54* (2013.01); *F05D 2260/40311* (2013.01)

(58) Field of Classification Search
CPC ....... F05D 2260/40311; F05D 2240/53; F05D 2260/74; F05D 2260/79; F05D 2260/98; F01D 15/12; F02K 3/025; F02K 3/06
USPC ..................................................... 415/122.1
See application file for complete search history.

(56) References Cited

U.S. PATENT DOCUMENTS

2018/0291819 A1    10/2018  Sheridan
2021/0017911 A1*    1/2021  Spruce ...................... F02C 7/36

OTHER PUBLICATIONS

International Search Report dated Apr. 1, 2021 in International Application No. PCT/FR2020/052390.
Written Opinion of the International Searching Authority dated Apr. 1, 2021 in International Application No. PCT/FR2020/052390.

* cited by examiner

AERONAUTICAL PROPULSION SYSTEM HAVING A LOW LEAKAGE FLOW RATE AND IMPROVED PROPULSION EFFICIENCY

CROSS REFERENCE TO RELATED APPLICATIONS

This application is a National Stage of International Application No. PCT/FR2020/052390 filed Dec. 11, 2020, claiming priority based on French Patent Application No. 1914191 filed Dec. 11, 2019, the contents of each of which being herein incorporated by reference in their entireties.

TECHNICAL FIELD

The present disclosure relates to the field of aeronautical propulsion systems, and more specifically turbofan propulsion systems having a high, or even very high, bypass ratio and a high propulsive efficiency.

BACKGROUND

A turbofan propulsion system generally comprises, from upstream to downstream in the direction of flow of the gases, a fan, a primary flow annular space and a secondary flow annular space. The mass of air sucked in by the fan is therefore divided into a primary stream, which circulates in the primary flow space, and into a secondary stream, which is concentric with the primary stream and circulates in the secondary flow space. The fan (or propeller) can be faired and housed in a fan casing or alternatively unducted of the USF type (Unducted Single Fan). The fan blades can be vanes or have a variable setting, the setting being adjusted according to the flight phases by a pitch change mechanism.

The primary flow space passes through a primary body comprising one or several compressor stages, for example a low-pressure compressor and a high-pressure compressor, a combustion chamber, one or several turbine stages, for example a high-pressure turbine and a low-pressure turbine, and a gas exhaust nozzle. Typically, the high-pressure turbine drives in rotation the high-pressure compressor via a first shaft, called high-pressure shaft, while the low-pressure turbine drives in rotation the low-pressure compressor and the fan via a second shaft, called low-pressure shaft. The low-pressure shaft is generally housed in the high-pressure shaft.

In order to improve the propulsive efficiency of the propulsion system and to reduce its specific consumption as well as the noise emitted by the fan, propulsion systems have been proposed having a high bypass ratio, that is to say the ratio between the flow rate of the secondary stream and the flow rate of the primary stream. By high bypass ratio, it will be meant here a bypass ratio greater than or equal to 10, for example comprised between 10 and 80 inclusive. To achieve such bypass ratios, the fan is decoupled from the low-pressure turbine, thus allowing independently optimizing their respective speed of rotation. Generally, the decoupling is achieved using a reduction gear such as an epicyclic or planetary reduction mechanism, placed between the upstream end of the low-pressure shaft and the fan. The fan is then driven by the low-pressure shaft via the reduction mechanism and an additional shaft, called fan shaft, which is fixed between the reduction mechanism and the disk of the fan.

This decoupling thus allows reducing the speed of rotation and the pressure ratio of the fan and increasing the power extracted by the low-pressure turbine. Indeed, the overall efficiency of the aeronautical propulsion systems is first-order conditioned by the propulsive efficiency, which is favorably influenced by a minimization of the variation in the kinetic energy of the air upon passing through the propulsion system. In a high bypass ratio propulsion system, most of the flow rate generating the propulsive force is constituted by the secondary stream of the propulsion system, the kinetic energy of the secondary stream being mainly affected by the compression it undergoes when passing through the fan. The propulsive efficiency and the pressure ratio of the fan are therefore related: the lower the pressure ratio of the fan, the better the propulsive efficiency.

Beyond its major impact on the propulsive efficiency, the choice of the fan pressure ratio also influences various technological characteristics of the propulsion system, including the diameter of the fan (and by extension the external dimensions of the propulsion system and of its nacelle, mass and drag), the rotational speed of the fan and the reduction ratio of the reduction mechanism.

However, (i) the more the reduction ratio increases, the greater its radial bulk so that the reduction mechanism is difficult to incorporate under the primary flow path and (ii) the higher the speed of the low-pressure shaft, the higher the speed of the low-pressure compressor driven by the low-pressure shaft, the lower the mean radius of the low-pressure compressor must be in order to limit the peripheral speed at the tip of the blades of the low-pressure compressor.

These two combined constraints lead to an inlet channel for the primary flow path (usually designated by its gooseneck shape) upstream of the low-pressure compressor presenting a slope all the steeper as the radial bulk of the reduction mechanism is high and as the mean radius of the low-pressure compressor is low. This results in an increase of the aerodynamic losses in this channel and in a poor supply of the low-pressure compressor which are detrimental to the propulsive efficiency of the propulsion system.

Currently, the preferred reduction mechanisms are of the epicyclic reduction gear type, in which the fan is driven by the planet carrier, the ring gear being fixed to the stator of the motor. Such architectures indeed allow achieving higher reduction ratios than the planetary-type reduction mechanisms (driving of the fan by the ring gear). The use of an epicyclic reduction gear, however, involves transferring the oil from the fixed reference of the motor to the rotating reference of the planet carrier to supply the bearings and teeth of this reduction gear. In addition, in the case of a propulsion system comprising a mechanism for changing the pitch of the fan blades, it is also necessary to transfer the oil supply of the pitch change mechanism from a fixed reference (lubrication unit) of the propulsion system to a rotating reference of the fan. For that purpose, it is known to use an OTB (Oil Transfer Bearing, for multi-passage rotating hydraulic seal or rotating oil transfer), which comprises a fixed part with respect to a stator part of the propulsion system and which is connected, via dedicated pipes, to the lubrication unit comprising an oil tank and a pump, and a rotating part which is secured in movement to a rotor part of the propulsion system. Typically, in the case where the reduction mechanism comprises an epicyclic reduction gear, the rotating part of the OTB is mounted on the low-pressure shaft, downstream of the reduction gear (with respect to the direction of flow of the gases in the propulsion system) and the oil is then transferred via pipes passing through the planet carrier of the reduction gear, which is fixed. The OTB is therefore radius-constrained by the diameter of the low-pressure shaft, which implies significant leaks (the leak flow rate being proportional to the radius of the OTB) and therefore a short lifespan for this component. Moreover, the OTB is inaccessible during a maintenance operation since it is downstream of the reduction gear. In case of failure, it is therefore necessary to dismount the reduction gear to be able to access the OTB.

Currently, the fan is supported by two bearings. However, when these two bearings are located upstream of the reduction mechanism, the reduction mechanism is cantilevered, which generates unfavorable dynamics at the level of the fan. Propulsion systems have therefore been proposed in which the front bearing of the fan, or thrust bearing, extends upstream of the reduction mechanism, while the rear bearing of the fan is placed downstream of the reduction mechanism. This configuration improves the absorption of the forces, the reduction mechanism being maintained on either side by bearings, and the dynamic situation of the fan. In order not to degrade the dynamics of the fan, it is therefore preferable to preserve this architecture of the bearings of the fan. However, this can pose difficulties when it is sought at the same time to reduce the space requirement, in particular radial space requirement, of the reduction mechanism and to simplify the oil supply. The center of gravity of the fan blades must further be as close as possible to the bearings supporting the rotor thereof.

SUMMARY

One aim of the present application is to propose an aeronautical propulsion system, such as a turbofan turbomachine whose fan is ducted, with or without variable setting of the fan blades, or an unducted propulsion system of the USF type, having a high bypass ratio and an improved propulsive efficiency, allowing, if necessary, having favorable dynamics of the fan and, optionally, a simplified lubrication system.

To this end, according to a first aspect, an aeronautical propulsion system is proposed comprising:
    a drive shaft movable in rotation about an axis of rotation,
    a fan,
    a fan shaft configured to drive the fan in rotation about the axis of rotation,
    a reduction mechanism coupling the drive shaft and the fan shaft.

In addition, the reduction mechanism has two reduction stages and includes:
    a sun gear, centered on the axis of rotation and configured to be driven in rotation by the drive shaft,
    a ring gear, coaxial with the sun gear and configured to drive in rotation the fan shaft about the axis of rotation, and
    a series of planet gears distributed circumferentially about the axis of rotation between the sun gear and the ring gear, each planet gear comprising a first portion meshed with the sun gear and a second portion meshed with the ring gear, a diameter of the first portion being different from a diameter of the second portion.

Furthermore, the first portion of the planet gears extends between the second portion of the planet gears and the fan.

Some preferred but non-limiting characteristics of the propulsion system according to the first aspect are the following, taken individually or in combination:
    the propulsion system further comprises an oil transfer bearing positioned between the fan and the reduction mechanism.
    in which the series of planet gears is mounted on a planet carrier and the propulsion system further comprises an oil tank and at least one pipe, the pipe fluidly connecting the oil tank to the oil transfer bearing via the planet carrier.
    the oil transfer bearing comprises a rotating part mounted on the fan shaft and a fixed part mounted on the planet carrier.
    the oil transfer bearing is positioned radially inwardly relative to the fan shaft.
    the oil transfer bearing is closer to the axis of rotation than the fan shaft.
    the propulsion system further comprises a mechanism for changing the pitch of the fan blades and an ancillary fluidly connecting the oil transfer bearing to the pitch change mechanism.
    the drive shaft is connected to the sun gear at a first interface, the fan shaft is connected to the ring gear at a second interface, the first interface being located further upstream than the second interface.
    the propulsion system further comprises a first fan bearing extending between the fan and the reduction mechanism and a second fan bearing extending between the reduction mechanism and a rotating wheel of a low-pressure compressor.
    the first fan bearing is mounted on the one hand on the fan shaft and on the other hand on an inner shroud of an inlet channel for a primary stream of the propulsion system.
    the series of planet gears is mounted on a planet carrier and the second fan bearing comprises an inner ring and an outer ring, one among the inner ring and the outer ring being mounted on the ring gear, the other among the inner ring and the outer ring being mounted on the planet carrier.
    the second fan bearing is mounted on the one hand on the ring gear and on the other hand on an inner shroud of an inlet channel for a primary stream of the propulsion system.
    the series of planet gears is mounted on a planet carrier and the reduction mechanism further comprises an inner bearing mounted on the one hand on the drive shaft and on the other hand on the planet carrier, radially inside the second portion of the planet gears or immediately downstream of the second portion of said planet gears.
    the reduction mechanism further comprises an inner bearing mounted on the one hand on the drive shaft in an area located upstream of the first portion of said planet gears.
    the aeronautical propulsion system can comprise a turbofan turbomachine whose fan is ducted, with or without variable setting of the fan blades, or an unducted propulsion system of the USF type.

According to a second aspect, the disclosure proposes an aircraft comprising an aeronautical propulsion system in accordance with the first aspect.

DESCRIPTION OF THE FIGURES

Other characteristics, aims and advantages of the disclosure will emerge from the following description, which is purely illustrative and not limiting, and which should be read in relation to the appended drawings in which.

In all the figures, similar elements bear identical references.

DETAILED DESCRIPTION

Figure 1:
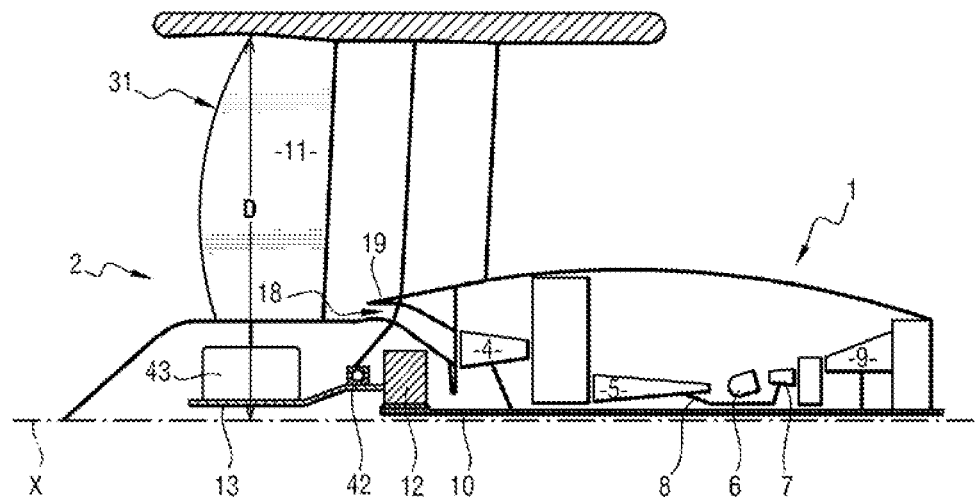
FIG. 1 schematically illustrates one example of an aeronautical propulsion system comprising a variable-setting ducted fan in accordance with one embodiment of the invention.

The propulsion system 1 comprises, conventionally, a fan 2 and a primary body. The primary body comprises, in the direction of flow of the gases in the propulsion system 1, an inlet channel 3 extending immediately downstream of the fan 2, a low-pressure compressor 4, a high-pressure compressor 5, a combustion chamber 6, a high-pressure turbine 7, a low-pressure turbine 9 and a gas exhaust nozzle. The high-pressure turbine 7 drives in rotation the high-pressure compressor 5 via a high-pressure shaft 8 while the low-pressure turbine 9 drives in rotation the low-pressure compressor 4 and the fan 2 via a low-pressure shaft 10.

The fan 2 comprises a fan disk 2 provided with fan blades 11 at its periphery which, when rotated, drive the air stream into the primary and secondary flow spaces of the propulsion system 1.

The low-pressure compressor 4 comprises at least one compression stage comprising a blade wheel (rotor) driven by the low-pressure shaft 10 and rotating in front of a series of vanes 15 (stators, or straighteners) distributed circumferentially about the axis X. If necessary, the low-pressure compressor 4 can comprise at least two compression stages.

The inlet channel 3 extends immediately downstream of the fan 2. It has an inlet 18 adjacent to the root 17 of the fan blades 11, directly in line with the separation slat 19 separating the primary flow space and the secondary flow space, and an outlet 20 adjacent to the low-pressure compressor 4. The inlet channel 3 has the general shape of a gooseneck, so that the inlet 18 is radially farther from the axis of rotation X than the outlet 20. The inlet channel 3 comprises, in a manner known per se, a row of vanes circumferentially distributed about the axis X.

The invention applies to any type of turbofan aeronautical propulsion system 1, whether the fan 2 is ducted or unducted, with fixed or variable setting blades.

In the present application, the upstream and the downstream are defined with respect to the normal direction of flow of the gas through the propulsion system. Furthermore, the axial direction corresponds to the direction of the axis of rotation X and a radial direction is a direction perpendicular to this axis of rotation X and passing therethrough. Furthermore, the circumferential (or lateral) direction corresponds to a direction perpendicular to the axis of rotation X and not passing therethrough. Unless otherwise specified, inner (respectively, internal) and outer (respectively, external), respectively, are used with reference to a radial direction so that the inner part or face of an element is closer to the axis of rotation X than the outer part or face of the same element.

The propulsion system 1 has a high bypass ratio. By high bypass ratio, it will be meant here a bypass ratio greater than or equal to 10, for example comprised between 10 and 31 in the case of a ducted fan 2 and between 40 and 80 in the case of an unducted fan 2. For that purpose, the fan 2 is decoupled from the low-pressure turbine 9 to independently optimize their respective speed of rotation using a reduction mechanism 12 placed between the upstream end (relative to the direction of flow of the gases in the propulsion system 1) of the low-pressure shaft 10 and the fan 2. The fan 2 is then driven by the low-pressure shaft 10 via the reduction mechanism 12 and a fan shaft 13, which is fixed between the reduction mechanism 12 and the fan 2 disk. The fan shaft 13 is movable in rotation about an axis of rotation X coaxial with the axis of rotation X of the low-pressure shaft 10.

To calculate the bypass ratio, the flow rate of the secondary stream and the flow rate of the primary stream are measured when the propulsion system 1 is stationary at take-off rating in a standard atmosphere (as defined by the International Civil Aviation Organization (ICAO), Doc 7488/3, 3rd edition) and at sea level.

In order to improve the propulsive efficiency of the propulsion system 1, the reduction mechanism is planetary and two-staged.

More specifically, the reduction mechanism 12 comprises:
a sun gear 33, centered on the axis of rotation X and configured to be driven in rotation by the low-pressure shaft 10, which plays the role of a drive shaft,
a ring gear 25, coaxial with the sun gear 33 and configured to drive in rotation the fan shaft 13 about the axis of rotation X, and
a series of planet gears 28 circumferentially distributed about the axis of rotation X between the sun gear 33 and the ring gear 25, each planet gear 28 comprising a first portion 38 meshed with the sun gear 33 and a second portion 39 meshed with the ring gear 25.

The first portions 38 of the planet gears 28 extend in the same plane and form a first stage 27 of the reduction mechanism 12 while the second portions 39 of the planet gears 28 extend in the same plane, which is parallel to that of the first portions 38, and form the second stage 32 of the reduction mechanism 12.

In comparison with the engines of the prior art, the propulsion system 1 has, for a high, or even very high, reduction ratio, a reduction mechanism 12 of smaller space requirement. As a result, the slope of the inlet channel 3 for the primary flowpath upstream of the low-pressure compressor 4 is gentler, which improves the supply to the low-pressure compressor 4. In parallel, a high reduction ratio allows reducing the speed of rotation and the compression ratio of the fan 2 and optimizing the dimensioning of the low-pressure turbine 9. The propulsive efficiency of the propulsion system 1 is therefore improved.

In addition, the reduction mechanism is inverted, that is to say the first portion 38 of the planet gears 28 extends between the second portion 39 of the planet gears 28 and the fan 2. It follows that the connection of the fan shaft 13 to the reduction mechanism 12 is located downstream with respect to the connection of the low-pressure shaft 10 to said reduction mechanism 12, which is located further upstream. However, the reduction mechanism 12 being two-staged and the speed of rotation of the fan shaft 13 being lower than the speed of rotation of the low-pressure shaft 10, the diameter of the first portion 38 is necessarily greater than the diameter of the second portion 39.

Thanks to this inverted configuration of the two-stage reduction mechanism 12, the part of the planet gears 28 whose radial space requirement is the smallest, namely the second portion 39, is closer to the low-pressure compressor 4, where the space under the flowpath is the smallest, while the part of the planet gears 28 whose radial space requirement is the largest, namely the first portion 38, is closer to the fan 2 (in line with the inlet 18 of the inlet channel 3), where the space under the flowpath is the most significant. The slope of the inlet channel 3 is therefore no longer constrained by the maximum diameter of the planet gears 28, namely the diameter of the first portion 38 of the planet gears 28, since this maximum diameter now extends at the level of its inlet 18. The slope of the inlet channel 3 for the primary flowpath upstream of the low-pressure compressor 4 can therefore be gentler than in the engines of the prior art, which improves the supply to the low-pressure compressor 4 and therefore the propulsive efficiency of the propulsion system 1.

Figure 3:
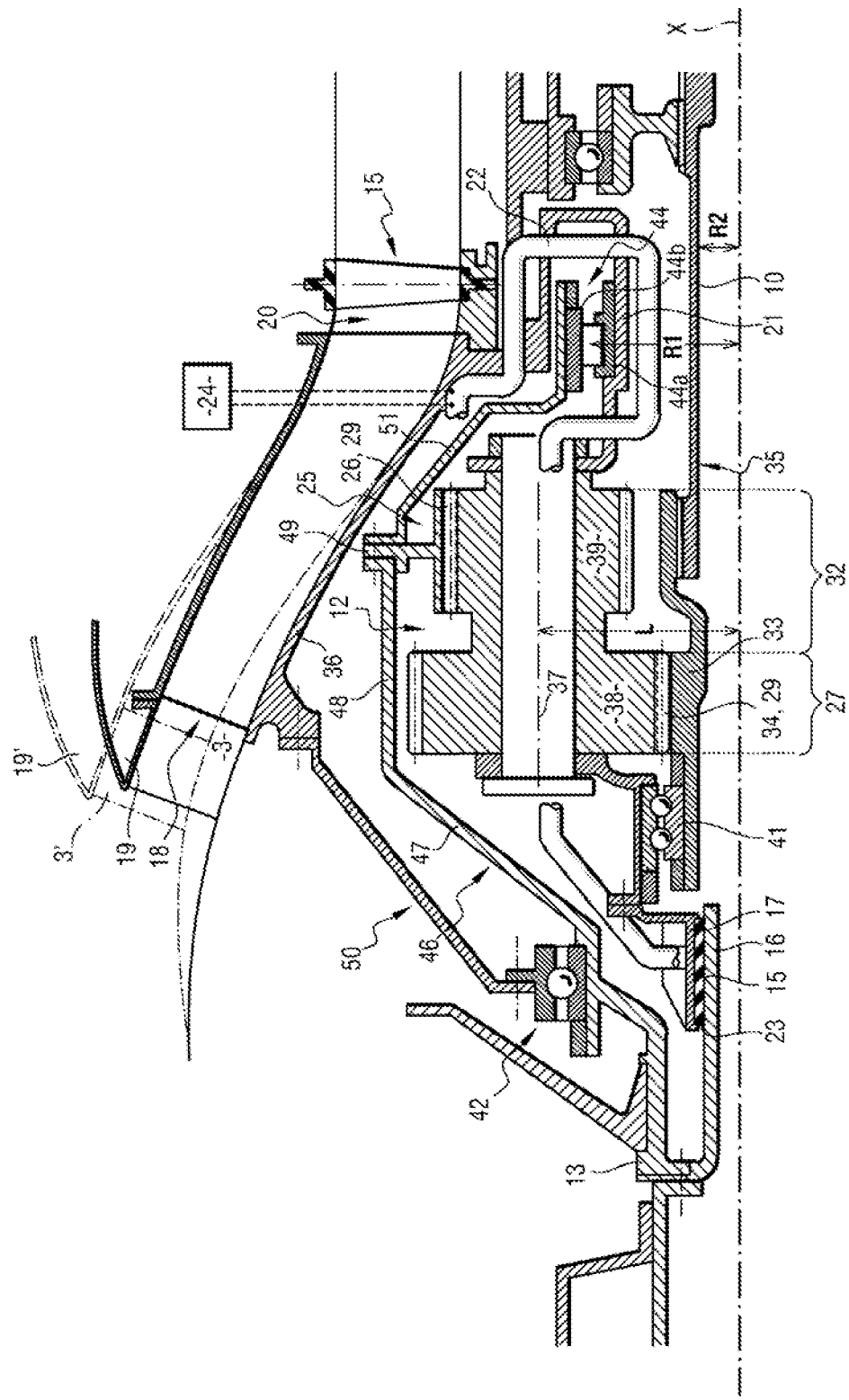
FIG. 3 is a detailed, partial and schematic sectional view of one example of a reduction mechanism which can be used in an aeronautical propulsion system in accordance with the invention. The inlet channel of a propulsion system of the prior art has further been represented in dotted lines in this figure.
Figure 6:
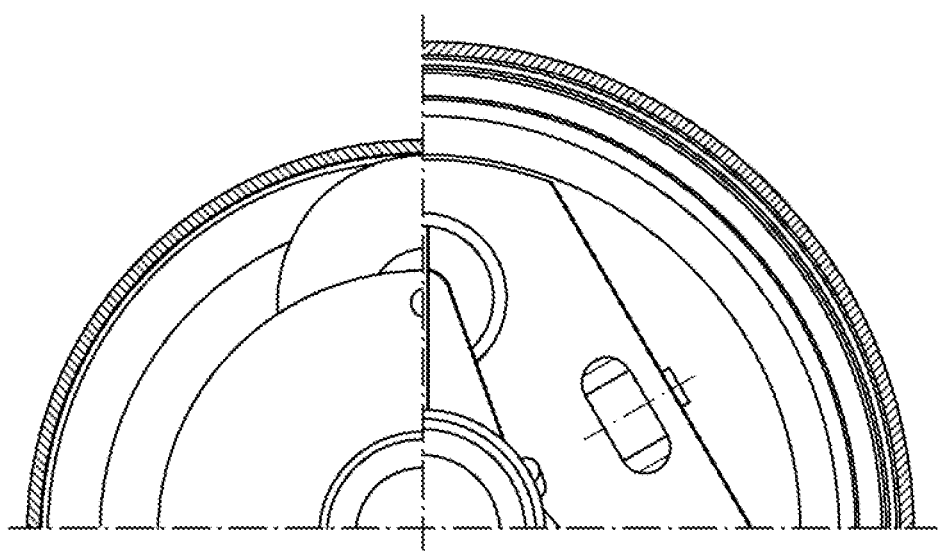
FIG. 6 is a schematic view illustrating on one (left) side an inverted two-stage planetary reduction mechanism and on the other (right) side a single-stage epicyclic reduction mechanism, for the same reduction ratio.

By way of comparison, FIG. 6 illustrates the radial space requirement obtained for an inverted two-stage planetary reduction mechanism 12 (on the left in the figure) and a single-stage epicyclic reduction mechanism (on the right of the figure), both having the same reduction ratio. This comparison shows that the reduction mechanism having the smallest radial space requirement, for the same reduction ratio, is the inverted two-stage planetary reduction mechanism 12. Similarly, FIG. 3 illustrates (in dotted lines) the shape of the inlet channel 3' when the reduction mechanism is of the single-stage epicyclic type (for the same reduction ratio). As is clearly apparent in this FIG. 3, the slope of the inlet channel 3' is significantly steeper than that of the inlet channel 3 of a propulsion system 1 comprising a two-stage planetary reduction mechanism 12, which generates aerodynamic losses and reduces the propulsive efficiency of the propulsion system 1.

The reduction ratio of the two-stage planetary reduction mechanism is at least equal to 3.

In the case of a propulsion system 1 comprising a ducted fan 2 (FIG. 1), and if necessary variable setting fan blades 11, the reduction ratio greater than or equal to 3, for example between 4.5 and 6.

Figure 2:
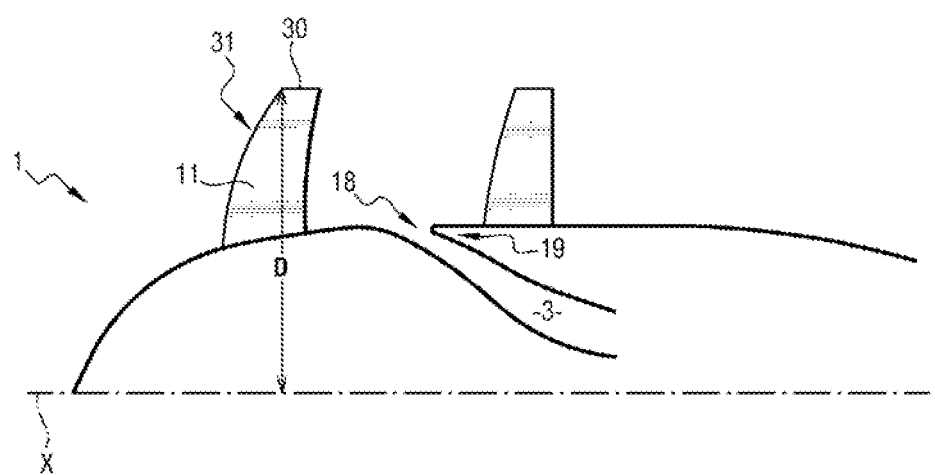
FIG. 2 schematically illustrates one example of an aeronautical propulsion system comprising an unducted fan of the USF type in accordance with one embodiment of the invention.

In the case of a propulsion system 1 comprising an unducted fan 2 (FIG. 2), for example of the USF type, the reduction ratio is greater than or equal to 6 and less than or equal to 14, preferably less than or equal to 12, for example between 7 and 10.

In one embodiment, the ring gear 25 includes first meshing means 26, the portions 38 and 39 of the planet gears 28 each include second meshing means 29 and the sun gear 33 comprises third meshing means 34. These first, second and third meshing means 26, 29, 34 comprise, in a manner known per se, straight, herringbone or helical teeth separated two by two by a groove.

More specifically, the sun gear 33 comprises a spline formed on its inner radial face configured to cooperate with a corresponding spline formed on the upstream end 35 of the low-pressure shaft 10 (or, if necessary, an intermediate shroud mounted between the upstream end 35 of the low-pressure shaft 10 and the sun gear 33). Alternatively, the upstream end 35 of the low-pressure shaft 10 (or the intermediate shroud) can be formed integrally and in a single piece with the sun gear 33 (the upstream end 35 and the sun gear 33 then being monolithic).

The ring gear 25 is movable relative to the casing of the propulsion system 1 and is connected to a downstream end of the fan shaft 13 via a fixing shaft 46 in order to drive it in rotation about the axis of rotation X. In one embodiment, the fixing shaft 46 comprises successively, from upstream to downstream, a frustoconical part 47 connected to the downstream end of the fan shaft 13, then a generally cylindrical part 48 extending radially outside the first portion 39 of the planet gears 28 and connected to a scallop 49 fixed on the ring gear 25.

The planet gears 28 are mounted on the planet carrier 21, which is fixed relative to the casing of the propulsion system. Typically, the planet carrier 21 can be mounted on the inner shroud 36 of the inlet channel 3. Each planet gear 28 is movably mounted in rotation on the planet carrier 21 about a respective axis of revolution 37, for example via plain bearings. Furthermore, each planet gear 28 is rotationally symmetrical with respect to its axis of revolution 37.

More specifically, the first portion 38 of each planet gear 28 is rotationally cylindrical with respect to its axis of revolution 37 and has an outer radial surface configured to cooperate with the outer radial surface of the sun gear 33. For that purpose, the second means for meshing the outer radial surface of this first portion 38, typically teeth 29, are configured to mesh with the third means for meshing 34 the sun gear 33, typically teeth formed on its outer radial face.

The second portion 39 of each planet gear 28 is rotationally cylindrical with respect to its axis of revolution 37 and has an outer radial surface configured to cooperate with the inner radial surface of the ring gear 25. For that purpose, the second means for meshing the outer surface of this second portion 39, typically teeth 29, are configured to mesh the teeth 26 of the ring gear 25.

The first portion 38 and the second portion 39 of each planet gear 28 are in one piece. For example, the first portion 38 and the second portion 39 of the same planet gear 28 can be formed integrally and in a single piece (monolithic). Alternatively, the first portion 38 and the second portion 39 of the same planet gear 28 can be assembled.

Furthermore, the planet gears 28 of the same reduction mechanism 12 are identical in shape and dimension.

Rotating the sun gear 33 by the low-pressure shaft 10 therefore has the effect of driving the planet gears 28 in rotation about their axis of revolution 37, which is fixed (the planet carrier 21 being fixed to the inner shroud 36 of the inlet channel 3). The second portion 39 of the planet gears 28 being meshed with the ring gear 25, which is movable, their rotation about their axis of revolution 37 has the effect of rotating the ring gear 25 about the axis of rotation X. Finally, the fan shaft 13 being connected to the ring gear 25, the rotation of ring gear 25 about the axis of rotation X has the effect of driving the fan shaft 13 in rotation about this axis of rotation X.

The second portion 39 of the planet gears 28 having a diameter strictly smaller than that of their first portion 38, the speed of rotation of the fan shaft 13 is lower than the speed of rotation of the low-pressure shaft 10. This diameter difference thus allows obtaining higher reduction ratios than in a single-stage reduction mechanism 12, for a comparable radial space requirement and a high propulsive efficiency. It follows that the diameter of the first portion 38 and the diameter of the second portion 39 of the planet gears 28 can thus be dimensioned so as to achieve a reduction ratio greater than or equal to 3 with a small radial space requirement, thus making it possible to soften the slope of the inlet channel 3.

The fan shaft 13 further comprises a front bearing 42, or thrust bearing, and a rear bearing 44. The thrust bearing 42 is interposed between the fan shaft 13 and a (fixed) stator part of the propulsion system 1 and is configured to absorb the axial forces generated by the fan 2 and those generated between the second portion 39 of the planet gears 28 and the ring gear 25. For example, the thrust bearing 42 can be mounted on the inner shroud 36 of the inlet casing 3, in the vicinity of the inlet 18, via a shroud 50.

The rear bearing 44 is mounted on the one hand on the ring gear 25 (on which the fan shaft 13 is mounted) and on the other hand on the planet carrier 21 or on the portion of the inlet casing 3 which is adjacent to the planet carrier 21.

The inverted configuration of the reduction mechanism 12 thus allows placing the thrust bearing 42 upstream of the reduction mechanism 12 and the rear bearing 44 downstream of the latter. Indeed, the minimum diameter of the planet gears 28 being downstream, an annular space is cleared under the outlet of the inlet channel 3 which allows passing fixing flanges 51 of the rear bearing 44 on the ring gear 25.

In a first embodiment illustrated in FIG. 3, the rear bearing 44 extends under the outlet 20 of the inlet channel 3, downstream of the planet gears 28 and is connected on the one hand to the ring gear 25 and on the other hand to the planet carrier 21. The inner ring 44a of the rear bearing 44 is mounted on the planet carrier 21 while its outer ring 44b is mounted on the ring gear 25, typically on the scallop 49, via a fixing flange 51. The rear bearing 44 can then extend to a radius R1 smaller than the radial distance L between the axis of revolution 37 of the planet gears 28 and the axis of rotation X, but greater than the radius R2 of the low-pressure shaft 10 (FIG. 3).

Figure 4:
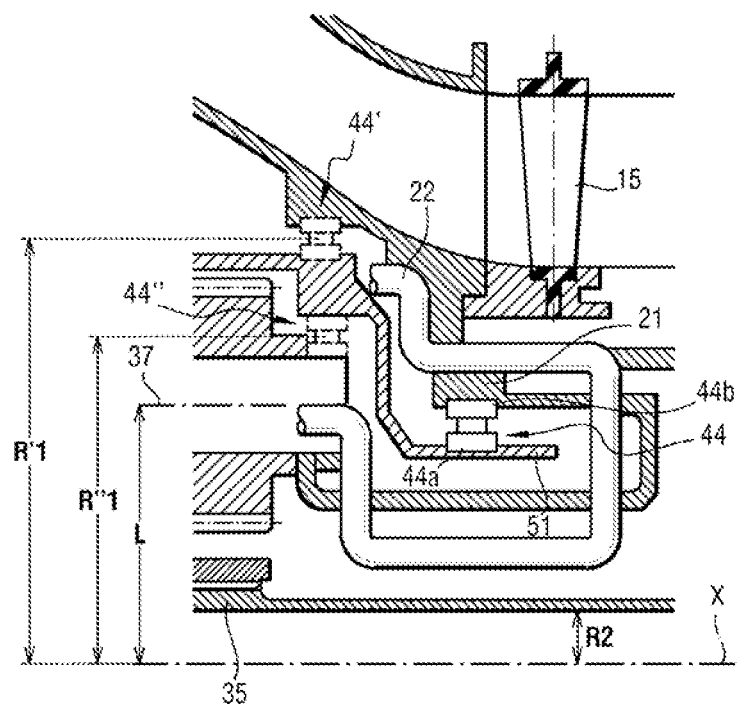
FIG. 4 is a partial detail view of a downstream portion of the reduction mechanism of FIG. 3, in which three examples of alternative location and connection of the rear fan bearing have been schematically represented.

In one variant of this first embodiment, which is illustrated in FIG. 4, the outer ring 44b of the rear bearing 44 is mounted on the planet carrier 21 while its inner ring 44a is mounted on the ring gear 25 via the fixing flange 51. The rear bearing 44 can then extend generally at the same distance from the axis of rotation X as the axes of revolution 37 of the planet gears 28. In other words, the radius R1 of the rear bearing 44 is generally equal to the radial distance L. The rear bearing 44 of this alternative embodiment then extends radially further outwardly relative to the axis of rotation X than in the case where the inner ring 44a is mounted on the planet carrier 21 (FIG. 3).

In a second embodiment which is represented very schematically in dotted lines in FIG. 4, the rear bearing 44' extends between the outlet 19 of the inlet channel 3 and the ring gear 25 and is connected on the one hand to the ring gear 25 and on the other hand to the inner shroud 36 of the inlet channel 3. The inner ring of the rear bearing 44' is mounted on the ring gear 25 via the fixing flange 51 while its outer ring is mounted on the inner shroud 36 of the inlet channel 3. The rear bearing 44' then extends to a radius R'1 greater than the radius of the ring gear 25 while remaining radially inside the inner shroud 36 of the inlet channel 3.

In a third embodiment which is also represented very schematically in dotted lines in FIG. 4, the rear bearing 44" extends immediately downstream of the second portion 39 of the planet gears 28 and is connected on the one hand to the fixing flange 51 and on the other hand to the planet carrier 21, at the level of its attachment to the planet gears 28. The inner ring of the rear bearing 44" is mounted on the fixing flange 51 which is connected to the ring gear while its outer ring is mounted on the planet carrier 21, at the level of its attachment to the planet gears 28. The rear bearing 44" then extends to a radius R"1 greater than the radial distance L but less than the radius of the ring gear 25.

In a first embodiment, the teeth 26, 29, 34 of the reduction mechanism 12 are helical.

In this embodiment, the reduction mechanism 12 further comprises an inner bearing 41 typically a double ball bearing or a hydraulic stop and configured to absorb the axial forces generated between the low-pressure shaft 10 and the first portion 38 of the planet gears 28 and thus balance the forces within the reduction mechanism 12.

In a first embodiment illustrated in FIG. 3, the inner bearing 41 is interposed between the sun gear 33 and the upstream end 35 of the low-pressure shaft. For example, the inner bearing 41 can then extend upstream of the first portion 38 of said planet gears 28, for example between the oil transfer bearing 15 (described in detail later in the description) and the sun gear 33.

Figure 5:
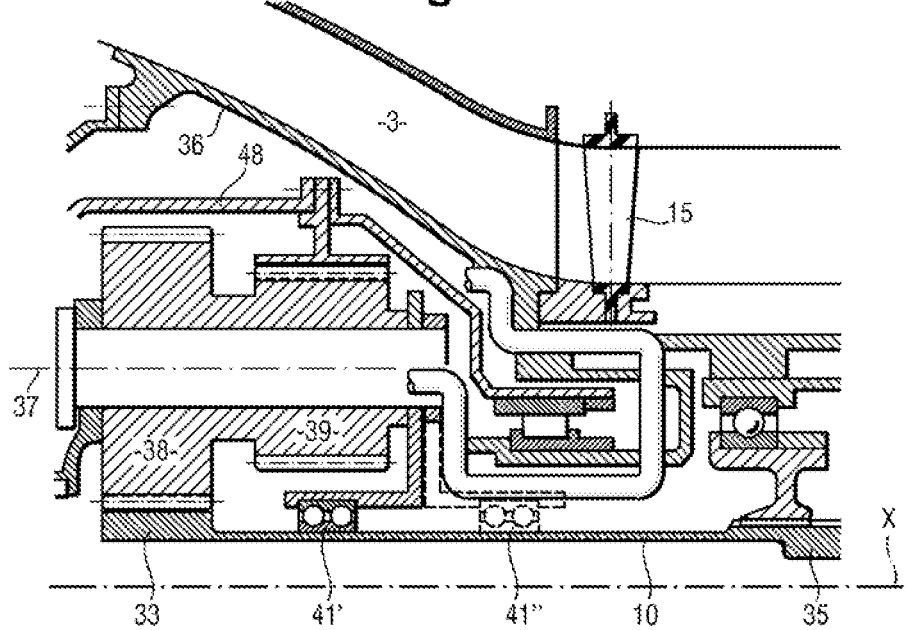
FIG. 5 is a partial detail view of the reduction mechanism of FIG. 3, in which two examples of alternative location and connection of the inner bearing of the reduction mechanism have been schematically represented.

In a second embodiment, the inner bearing 41' can be interposed between the upstream end 35 of the low-pressure shaft 10 and the planet carrier 21, for example by extending radially inside the second portion 39 of the planet gears 28 (in solid lines in FIG. 5) or immediately downstream of this second portion 39 (41", in dotted lines in FIG. 5), under the planet carrier 21.

Optionally, the helical shape of the teeth 26, 29, 34 of the reduction mechanism 12 allows limiting the axial forces absorbed by the thrust bearing 42. The choice of the helix angles of the teeth 26, 29, 34 and their orientation (sign) thus allows compensating for the axial forces generated by the fan and usually absorbed by the thrust bearing 42 by creating a moment which compensates for the moments within the reduction mechanism 12. For example, a helix angle (with respect to a plane comprising the axis of rotation X and the axis of revolution 37 of the planet gear 28) of the teeth 29 of the second portion 39 of each planet gear 28 comprised between 10° and 20° allows the meshing between the ring gear 25 and the second portion 39 of the planet gears 28 to compensate for at least part of the tensile forces applied by the fan 2 on the reduction mechanism 12. The size of the thrust bearing 42 at the level of the fan 2 can therefore be reduced thanks to the compensation of the tensile force applied by the fan 2 on the reduction mechanism 12 by the meshing of the helical teeth of the ring gear 25 with the second portion 39 of the planet gears 28.

Furthermore, a helix angle (with respect to a plane comprising the axis of rotation X and the axis of revolution 37 of the planet gear 28) of the teeth 29 of the first portion 38 of each planet gear 28 comprised between 10° and 30°, preferably between 15° and 25°, allows compensating for the forces at the level of the inner bearing 41 of the reduction mechanism 12 and therefore reducing the losses at the level of this stop 41. Indeed, the axial forces of the second stage 32 are compensated by the axial forces of the first stage 27, thus creating a tilting moment at the level of the inner bearing 41. This tilting moment can be compensated by the radial meshing forces, thus ensuring purely radial operation at the level of the inner bearing 41. An architecture is thus obtained in which the reduction mechanism 12 is maintained on both sides by bearings 42, 44.

It will further be noted that the use of a two-stage planetary reduction mechanism 12 makes the dimensioning of the diameter of the splines of the low-pressure shaft 10 more flexible. Indeed, at iso-space requirement under the inlet channel 3 of the propulsion system 1, the radial space requirement of the ring gear 25 of a two-stage planetary reduction mechanism 12 is reduced, which allows, if necessary, increasing the diameter of the splines on the upstream end 35 of the low-pressure shaft 10. A By way of comparison, in the case of a single-stage reduction mechanism, to obtain a high reduction ratio, it is necessary to reduce the diameter of the splines of the low-pressure shaft to comply with the total radial space requirement of the reduction mechanism 12 under the inlet channel 3.

In a second embodiment, the teeth 26, 29, 29', 34' of the reduction mechanism 12 are straight. In this embodiment, the inner bearing 41 is then optional.

The propulsion system 1 further comprises an oil transfer bearing 15 (or OTB).

The use of a reduction mechanism 12 of the planetary type allows placing the oil transfer bearing 15 upstream of the reduction mechanism, between the fan 2 and the reduction mechanism 12, and connecting it fluidly to the oil tank 24 of the lubrication unit via pipes 22 passing through the planet carrier 21. In other words, it is no longer necessary to transfer the oil from the fixed reference of the motor to a rotating reference of the reduction mechanism 12 to supply the bearings and teeth of the reduction mechanism: it suffices to transfer the oil directly into the pipes 22 passing through the planet carrier 21, which is fixed, and then to supply the bearings and teeth 26, 29, 34 of the reduction mechanism 12 from these pipes 22. The lubrication system of the propulsion system 1 is therefore greatly simplified.

In addition, the oil transfer bearing 15 being placed upstream of the reduction mechanism 12, it is easier to access, which simplifies the maintenance operations. In addition, the oil transfer bearing 15 can be placed closer to the axis of rotation only when it is downstream of the reduction mechanism 12, since it is no longer limited by the external diameter of the low-pressure shaft 10. Particularly, it is possible to position the oil transfer bearing 15 radially inwardly relative to the fan shaft 13: the oil transfer bearing 15 is therefore radially closer to the axis of rotation X than the fan shaft 13. The radial distance d between the oil transfer bearing 15 and the axis of rotation X is therefore significantly smaller than when the oil transfer bearing 15 is placed downstream of the reduction mechanism 12, and in particular smaller than the radius R of the low-pressure shaft 10. The leak flow rates, which are proportional to the distance d to the axis of rotation X, are therefore reduced, which drastically increases the lifespan of the oil transfer bearing 15.

The structure of the oil transfer bearing 15 and its supply are therefore simplified.

In one embodiment, the oil transfer bearing 15 comprises a rotating part 16 mounted on the fan shaft 13 and a fixed part 17 mounted on the planet carrier 21.

Optionally, the propulsion system 1 further comprises a pitch change mechanism 43 configured to modify the setting angle of the fan blades 11 according to the flight phases of the propulsion system. This pitch change mechanism 43 then requires supply means for a pitch change cylinder and possibly lubrication means (such as injection nozzles) supplied with oil by the oil transfer bearing 15. The propulsion system 1 therefore further comprises ancillaries 23 for supplying oil extending between the rotating part 16 of the oil transfer bearing 15 and the pitch change mechanism 43. These ancillaries 23 are secured in rotation to the rotating part 16 of the oil transfer bearing 15.

Advantageously, the oil transfer bearing 15 being positioned upstream of the reduction mechanism 12, the distance between the oil transfer bearing 15 and the lubrication means is shorter, therefore simpler, than in the prior art.

In addition, only the portion of the oil transfer bearing 15 supplying the means for actuating the pitch change mechanism 43 comprises a rotating portion, the oil transfer bearing 15 being supplied via the pipes 22 passing through the planet carrier 21, which is fixed.

Furthermore, in the case of a propulsion system 1 comprising a ducted fan 2, the diameter D of the fan 2 can be comprised between 105 inches (266.7 cm) and 135 inches (342.9 cm). in the case of a propulsion system 1 comprising an unducted fan 2, the diameter D of the fan 2 can be comprised between 150 inches (381 cm) and 180 inches (457.2 cm), for example on the order of 167 inches (424.18 cm). By fan 2 diameter D, it will be meant here twice the distance, in a plane radial to the axis of rotation X, measured between the axis of rotation X and the tip 30 of the fan blades 11 at the intersection between the leading edge 31 and the tip 30 of the blade 11. By leading edge 31, it will be meant here the edge of the blade 11 configured to extend facing the flow of gases entering the fan 2. It corresponds to the anterior part of an aerodynamic profile which faces the air stream and which divides the flow of air into an intrados flow and an extrados flow. The trailing edge corresponds for its part to the posterior part of the aerodynamic profile, where the intrados and extrados flows meet.

In addition, for these fan 2 diameters D and rotational speeds, the compression ratio of the ducted fan 2 can be comprised between 1.04 and 1.29 while the pressure ratio of the unducted fan 2 can be comprised between 1.01 and 1.025. The fan 2 compression ratio is measured here under the same conditions as the bypass ratio, that is to say when the propulsion system 1 is stationary at take-off rating in a standard atmosphere (as defined by the manual of the International Civil Aviation Organization (ICAO), Doc 7488/3, 3rd edition) and at sea level.

The bypass ratio of the propulsion system 1 can then be comprised between 10 and 31 in the case of a ducted fan 2 and between 40 and 80 in the case of an unducted fan 2.

The peripheral speed at the head of the fan blades 11 (that is to say measured at the level of their tip 30) at take-off rating as defined above is comprised between 260 m/s and 330 m/s when the fan 2 is ducted and 260 m/s and 330 m/s when the fan 2 is ducted and is less than 225 m/s when the fan 2 is unducted.

The invention claimed is:

1. A propulsion system comprising:
    a drive shaft movable in rotation about an axis of rotation;
    a fan;
    a fan shaft configured to drive the fan in rotation about the axis of rotation;
    a reduction mechanism coupling the drive shaft and the fan shaft, wherein the reduction mechanism has a first reduction stage and a second reduction stage and includes:
        a sun gear, centered on the axis of rotation and configured to be driven in rotation by the drive shaft,
        a ring gear, coaxial with the sun gear and configured to drive in rotation the fan shaft about the axis of rotation, and
        planet gears distributed circumferentially about the axis of rotation between the sun gear and the ring gear, each planet gear comprising a first portion forming the first reduction stage which is meshed with the sun gear and a second portion forming the second reduction stage which is meshed with the ring gear, a diameter of the first portion being different from a diameter of the second portion, the first portion of the planet gears extending between the second portion of the planet gears and the fan.

2. The propulsion system according to claim 1, further comprising an oil transfer bearing positioned between the fan and the reduction mechanism.

3. The propulsion system (1) according to claim 2, wherein the planet gears are mounted on a planet carrier and the propulsion system further comprises an oil tank and a pipe, the pipe fluidly connecting the oil tank to the oil transfer bearing via the planet carrier.

4. The propulsion system according to claim 2, wherein the oil transfer bearing comprises a rotating part mounted on the fan shaft and a fixed part mounted on the planet carrier.

5. The propulsion system according to claim 2, wherein the oil transfer bearing is positioned radially inwardly relative to the fan shaft.

6. The propulsion system according to claim 2, wherein the oil transfer bearing is closer to the axis of rotation than the fan shaft.

7. The propulsion system according to claim 2, further comprising a pitch change mechanism for changing a pitch of fan blades of the fan and an ancillary fluidly connecting the oil transfer bearing to the pitch change mechanism.

8. The propulsion system according to claim 1, wherein the drive shaft is connected to the sun gear at a first interface, the fan shaft is connected to the ring gear at a second interface, the first interface being located further upstream than the second interface.

9. The propulsion system according to claim 1, further comprising a first fan bearing extending between the fan and the reduction mechanism and a second fan bearing extending between the reduction mechanism and a rotating wheel of a low-pressure compressor.

10. The propulsion system according to claim 9, wherein the first fan bearing is mounted on the fan shaft and on an inner shroud of an inlet channel for a primary stream of the propulsion system.

11. The propulsion system according to claim 9, wherein the planet gears are mounted on a planet carrier and the second fan bearing comprises an inner ring and an outer ring, one of the inner ring and the outer ring being mounted on the ring gear, and the other the inner ring and the outer ring being mounted on the planet carrier.

12. The propulsion system according to claim 9, wherein the second fan bearing is mounted on the ring gear and on an inner shroud of an inlet channel for a primary stream of the propulsion system.

13. The propulsion system according to claim 1, wherein the planet gears are mounted on a planet carrier and the reduction mechanism further comprises an inner bearing mounted on the drive shaft and on the planet carrier, radially inside the second portion of the planet gears or immediately downstream of the second portion of the planet gears.

14. The propulsion system according to claim 1, wherein the reduction mechanism further comprises an inner bearing mounted on the drive shaft on the sun gear in an area located upstream of the first portion of said planet gears.

15. An aircraft comprising the propulsion system according to claim 1 fixed to the aircraft.

* * * * *